United States Patent [19]

Hechler, IV

[11] 4,029,299

[45] June 14, 1977

[54] MULTI-STAGE SOLUTION PROPORTIONER DISPENSER

[76] Inventor: Valentine Hechler, IV, 26 Meadowview Drive, Northfield, Ill. 60093

[22] Filed: Dec. 8, 1975

[21] Appl. No.: 638,529

Related U.S. Application Data

[60] Division of Ser. No. 615,800, Sept. 22, 1975, which is a continuation-in-part of Ser. No. 520,676, Nov. 4, 1974, Pat. No. 3,984,053, which is a continuation-in-part of Ser. No. 443,831, Feb. 27, 1974, Pat. No. 3,933,179.

[52] U.S. Cl. .............................. 259/4 R; 137/604; 417/163; 417/169
[51] Int. Cl.² ...................... B01F 15/00; F04F 5/22
[58] Field of Search ............. 259/4 R; 137/604; 417/163, 169

[56] References Cited

UNITED STATES PATENTS

| | | | |
|---|---|---|---|
| 2,646,346 | 7/1953 | Coplan et al. | 259/4 R |
| 3,188,055 | 6/1965 | Lutjens et al. | 259/4 R |
| 3,502,103 | 3/1970 | Verschuur | 137/604 |
| 3,799,195 | 3/1974 | Hermans | 137/604 |
| 3,933,179 | 1/1976 | Hechler | 137/604 |
| 3,938,550 | 2/1976 | Hechler | 137/604 |

FOREIGN PATENTS OR APPLICATIONS 609,508   1935   Germany .................. 259/4 R

*Primary Examiner*—William Price
*Assistant Examiner*—Douglas B. Farrow
*Attorney, Agent, or Firm*—Watson D. Harbaugh

[57] ABSTRACT

A low cost liquid proportioning and mixing device of high accuracy dispensing a solution or mixture involving volume, pressure and flow rates and including a multi-stage jet proportioning and mixing device in which any variation occurring in the designed ratio of the mixture is confined essentially to the first proportioning stage operating at a low solution ratio below 1 to 5 with the pressure of free flowing solute entering the zone of confluence for each stage and the pressure of the mixture leaving the zone of confluence being essentially equal and the outflow area of any final discharge opening is possibly less but not greater than the flow area of the conduit opening from the zone of confluence of the final stage with or without a conduit used between them, the final proportion of the solution being the multiplicand of the solution proportion of the individual stages.

11 Claims, 14 Drawing Figures

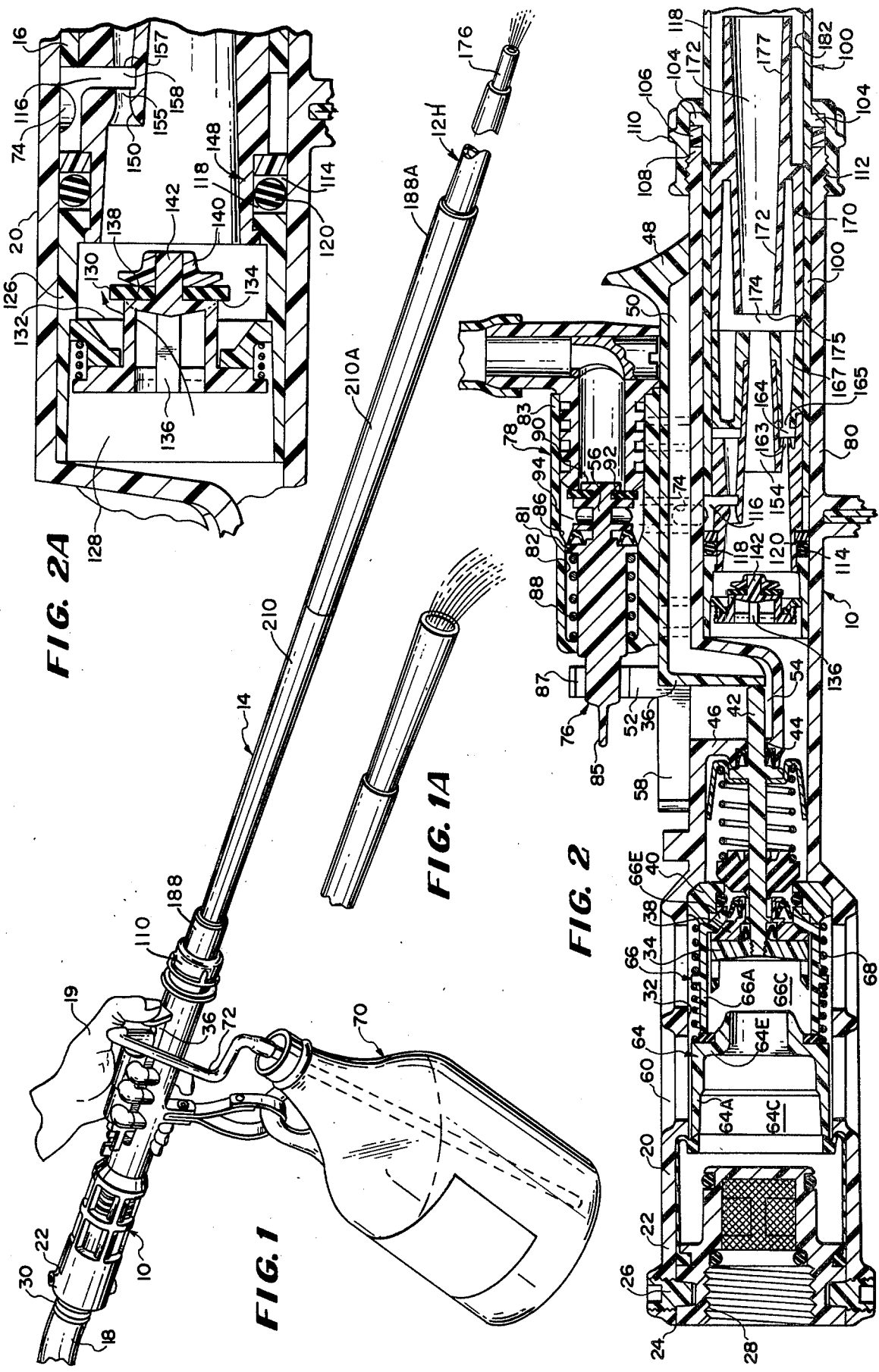

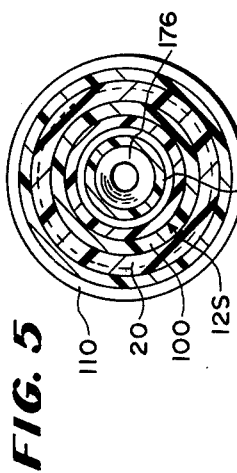
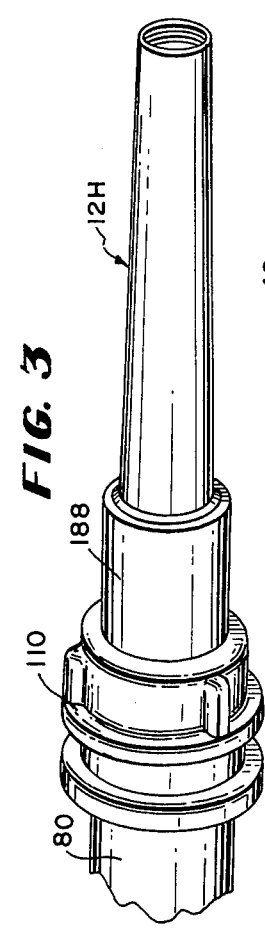
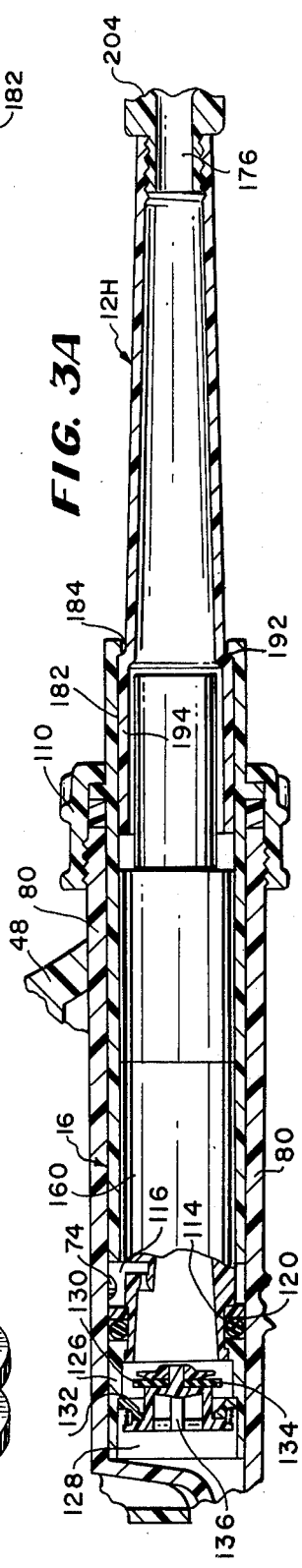
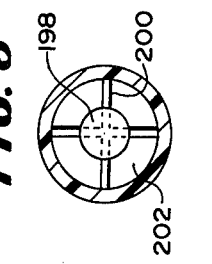
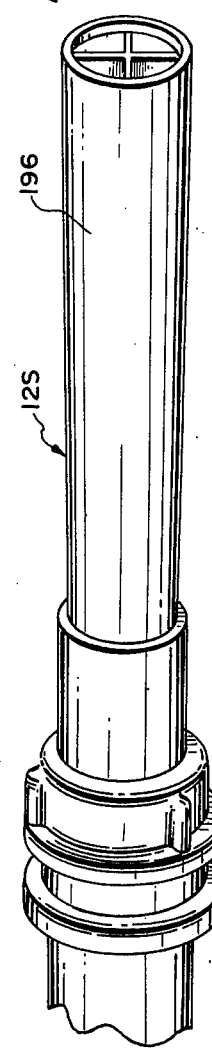
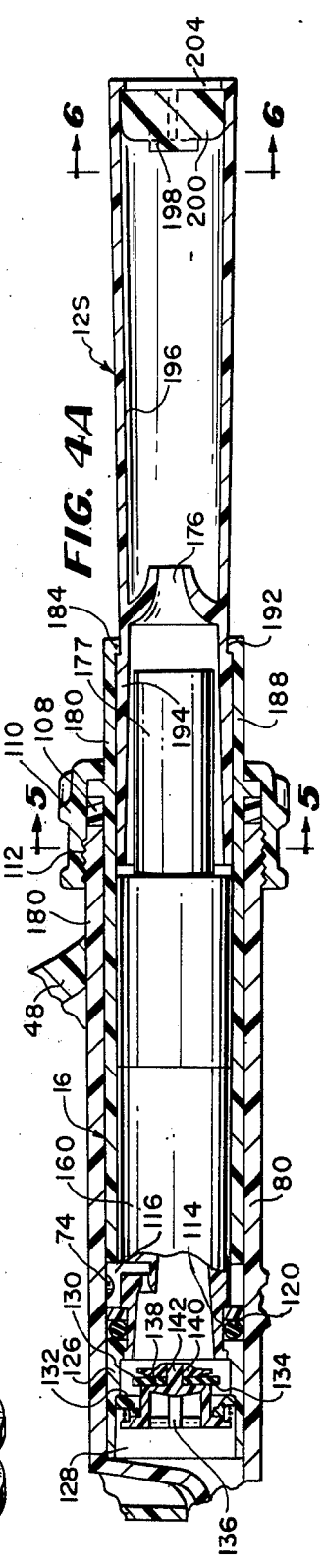

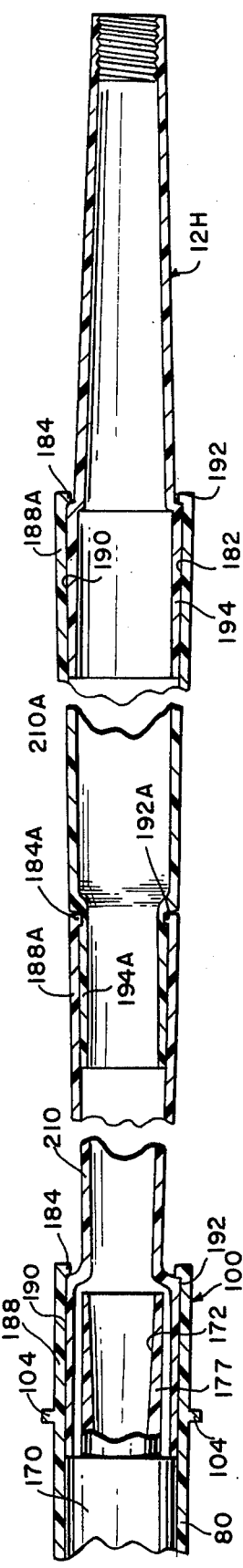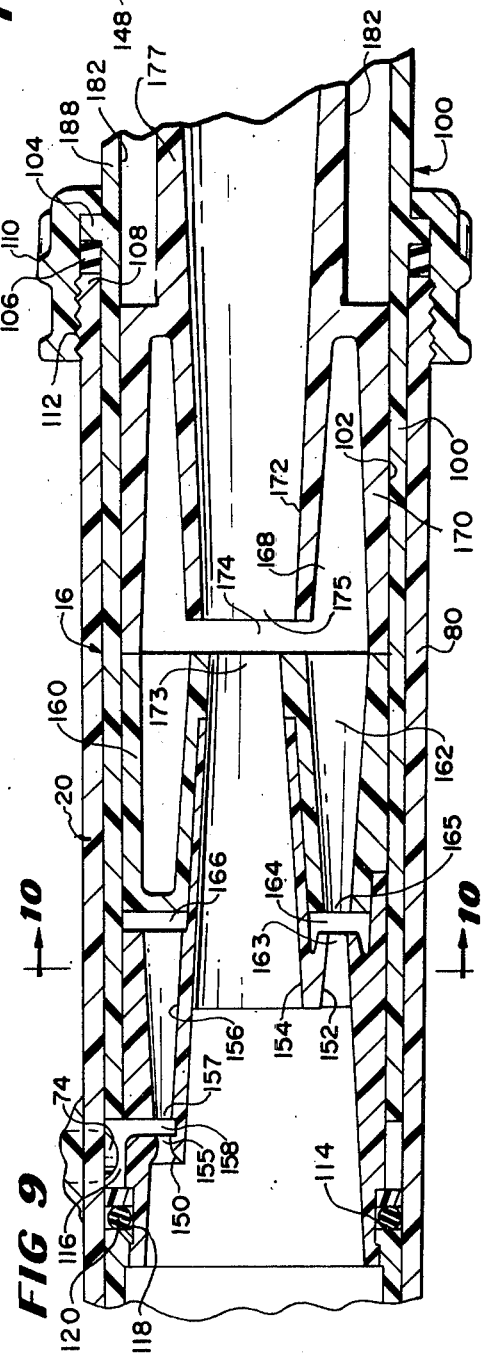

MULTI-STAGE SOLUTION PROPORTIONER DISPENSER

CROSS-REFERENCES

This is a division of Application Ser. No. 615,800, filed on Sept. 22, 1975, which is a continuation-in-part application of the Hechler application Ser. No. 520,676, now U.S. Pat. No. 3,984,053 dated Nov. 4, 1974, which in turn is a continuation-in-part of Ser. No. 443,831, now U.S. Pat. No. 3,933,179 dated Feb. 27, 1974.

Hechler Pat. Nos. 3,862,640; 3,863,665; and 3,863,843.

BACKGROUND OF INVENTION

In the proportioning of a miscible solute in a water solvent under continuous flow, objectionable ratio variation of over 50% can occur in the simple low cost conventional systems because of pressure variations in either the solvent supply and/or the solute supply lift heights. The conventional practice particularly with portable units has predominantly become the use of either one of two designs in single stage related to the relative pressure of the solute at the mixing chamber, both having their advantages and disadvantages:

1. High Vacuum, metered solute flow: A mixing system which develops a deep vacuum condition approaching zero p.s.i. absolute upon the solute, for conducting the solute through a flow restriction at the mixing chamber level in order to meter the amount of solute desired for a ratio proportioning related to a resulting high vacuum effect thereof in the mixing chamber in order to reduce the significance of lift height variations on the solute supply pressure to the flow restriction; or, 2. Low Vacuum, free solute flow: A mixing system in which the pressure acting upon the solute in the confluence chamber essentially differs only by the free flow low vacuum lift height variations of the solute and proportioning is essentially independent of variations in solvent pressure.

In the high vacuum metered flow system, since vacuum is related to the pressure of the environment, the ratio proportioning in the first stage is adversely affected by variations in solvent pressures, and, at lower ratios because of the extensive deterioration occasioned by the high vacuum variations on the solute supply to the confluence chamber. In the low vacuum free flow system, the ratio proportioning is adversely affected by variations in solute lift heights, particularly at higher ratios because of the increase of ratio degradation with increasing ratio and also at higher ratios there is greater difficulty of providing and maintaining the relationship between inlet and outlet ports of the mixing chamber.

Although either system is quite accurate if the exact design solute and solvent pressures are used and their relationship remains constant, only a small percentage of the commercial market would be satisfied and the danger of improper solution ratios still confront most of the users since standard concentrates are supplied and solvent pressures available significantly vary quite widely.

Thus, at conventionally tolerated performance ratios which are available, the solute metered flow system is generally used as limited to ratios above a 1 to 10 and the free flow solute system limited to ratios below 1 to 24. Two-stage conventional high vacuum gap proportioners may provide a better pressure output efficiency, but they perform no better than single stage proportioners with respect to ration variations caused by the solvent pressure variations occurring in both stages.

SUMMARY OF INVENTION

The present invention provides: a mathematically standardized, low cost, portable, continuous proportioning-mixing-dispensing procedure and system; controlled by the actual ratios of the flow port areas for use in mass produced proportioners that deliver a predictably accurate ratio generally within a variation of plus or minus 5%; with a free open flow of solute upwardly or downwardly a few feet; over a substantially complete range of usable ratios including the high ratio range which economizes on container sizes for concentrated solutes; and performs thusly over the expected range of municipal water supply pressures above a low pressure that is selected as adequate for dispensing and ecologically safe against possible backflow contamination of the water supply. The first stage protects the later stages against variation therein and the last stage protects the preceding stages against variations therein other than possible changes in the first stage due to lift height changes.

"Variation" as used here is sometimes referred to as degradation and means a plus or minus change in percentage ratio from the percentage ratio. The multi-stage mixer has at least two stages in which the output of the first stage is the solute for the next stage.

Readily interchangeable inexpensive mixers with fixed ratio stages and flow rates are provided for selective use if a different solution ratio is to be dispensed by the same gun.

Each mixing stage of the invention basically comprises a mixing zone at the confluence between a free flowing solute and a jet of solvent that entrains the solute and ejects the mixture coaxially through an outlet port. A coverging wall nozzle having an inlet port opening into the zone accepts solvent under pressure and converts it to kinetic energy in the jet and the outlet port having a larger flow area generally leads to a diverging wall passage that converts kinetic flow energy back to pressure.

For ratio accuracy in the mixing zone the pressure of the solute entering said zone must be equal to the pressure of the mixture leaving the zone as it passes through the outlet port. At the first stage such pressure preferably is the environmental pressure in normal use. Where the mixture from the previous stage is used as a solute the pressures at subsequent stages are the respective pressures upon the mixtures after the reconversion from kinetic flow energy.

With the implementation of these conditions the mixture ratio provided at any zone is related to the ratio of the flow areas of its inlet and outlet ports in percentage proportions of the mixture designed regardless of variations of solvent and solute pressures.

Furthermore, if any degradation occurs it will occur in the first stage due to variation of the solute pressure and be fractionally minimized in subsequent stages. Accordingly, the attainment of the ultimate ratio in the invention is divided in such a way that the first stage ratio is designed to be approximately that where minimal ratio variation occurs with variations in solute pressure, preferably a 1 to 4 ratio (20% solution), with an accuracy better than plus or minus 10% within a lift height range of plus or minus 4 feet to accommodate the use of floor and shelf height solute supplies.

The output of the last stage may be a directed jet discharge from the final outlet port without a diverging wall energy converter but preferably is provided with such a converter followed by a dispensing nozzle having a low pressure (soft flow) or an applicator nozzle ejecting at high pressure (hard flow) with or without an extension conduit being used.

In either embodiment the flow area of the ultimate discharge outlet is not greater than the flow area of the outlet port from the last confluence, but rather smaller yet not small enough to cause a back pressure feedback through the system that would cause a degradation of ratio in the earlier stages. Accordingly, the "hard flow" embodiment is described herein since it can be used universally with either hard and soft nozzles also described herein. However, a "soft flow" embodiment may be provided that has port areas designed for that purpose wherein the pressure at the confluence of each stage is essentially at atmospheric pressure rather than at increasingly higher pressures. The principles and concepts portrayed herein apply to both except the diverging wall sections at the outlet ports of each confluence chamber of the soft flow modification are shorter and convert only enough kinetic energy required to compensate for pressure losses occurring in the preceding stage.

Preferably, all or only the critical inlet and outlet ports may be cylindrical for a short distance to minimize any enlargement thereof due to flow abrasion, and, the solute gauge pressures are effective at least within a distance equal to the radius of the respective outlet ports of the confluence chambers.

Furthermore, in the present multi-stage invention it is preferred that the solution ratios of each stage be below 1 to 5. The lower the ratios the easier the manufacturing tolerances, the less the effect of port erosion in use, and the more stable the ultimate ratio under any unexpected changes in solute supply characteristics.

IN THE DRAWINGS

FIG. 1 is a perspective view of the proportioning mixer-dispenser embodying the preferred embodiment of the invention as manipulated in use and operation with an extender and hard flow nozzle thereon.

FIG. 1A is a perspective view of the end of the extender shown in FIG. 1 carrying a soft flow nozzle thereon.

FIG. 2 is a longitudinal vertical sectional view through the gun handle portion of the equipment shown in FIG. 1.

FIG. 2A is an enlarged view of the prime maintaining valve ahead of the entrances of the solvent jets.

FIGS. 3 and 4 are enlarged perspective views of the hard flow nozzle of FIG. 1, the soft flow nozzle of FIG. 1A, as attached directly to the proportioner-mixer unit, respectively.

FIGS. 3A and 4A are longitudinal sections showing the internal construction of the nozzles and their attachment.

FIGS. 5 and 6 are sectional views of the soft flow nozzle taken on lines 7—7 and 8—8 of FIG. 4A.

FIGS. 7 and 8 are sectional views of the hard flow and soft flow nozzles and extender shown in FIGS. 1 and 1A, respectively, shown attached as units to the proportioner-mixer output.

FIG. 9 is an enlarged longitudinal sectional view of the proportioner-mixer having three stages shown in FIG. 2, and FIG. 10 is a sectional view taken on line 10—10 of FIG. 9.

DESCRIPTION OF PREFERRED EMBODIMENT

The invention will be described, by way of example, as related to the proportioning, mixing and dispensing of municipal water under pressures of 15 to 100 p.s.i.g. serving as a solvent, and a chemical concentrate serving as a solute having a free open flow that is subject only to minor gravity influences, either positive or negative, if at all. The mixture is dispensed from a gun 10 under pressure through either one of two types of nozzles 12 with or without an extender conduit 14 between the nozzle 12 and the proportioning-mixer 16.

The invention is illustrated as part of a manually controlled automatically vented proportioner-mixer-dispenser gun 10, such as illustrated in Hechler U.S. Pat. No. 3,862,640, connected to the outlet of a garden hose 18 to utilize municipal water pressure having a working pressure of 40 p.s.i.g., and the mixture is dispensed from the other end of the gun 10 as controlled by a person 19 holding and manipulating the gun to which a solute supply is connected.

SOLVENT SUPPLY AND FLOW CONTROL

The housing 20 inlet end 22 receives an adapter 24 (FIG. 2) selected for the source of solvent and it is held in place by screws 26. As shown, the adapter has a threaded opening 28 mating only with an outlet male fitting 30 such as conventionally provided on a garden hose 18 for dispensing municipal water.

The flow control and low positive gauge pressure venting is more particularly described in Hechler U.S. Pat. No. 3,862,640 and application Ser. No. 520,676. Briefly, referring now to FIG. 2, the gun 10 preferably has the unitary housing 20 that provides an anti-contamination venting chamber 32 in which manual control of the flow of solvent through the compartment is provided by a dual valve arrangement in which a pilot valve 34 is opened first by a slidably manually operated actuator 36 with a low opening effort followed by equalization and a main valve 38 is then opened with a final low effort full opening. A backflow check valve 40 opens with the incoming flow and closes with no flow whether the flow control valves 34 or 38 are open or not.

In controlling the solvent flow, the outer end of a stem 42 for the manual valve 34 extends in an axial direction through an opening 44 in a cross-wall portion 46 where a thumb handle 48 actuated manually operates a push rod 50 reciprocally mounted on the housing 20 to drive a T-shaped head 52 that actuates the valve stem 42 where it projects into a recess 54 and selectively actuates the solute valve 56. At its rear end a manual release spring latch hook element 58 is provided selectively to hold the main valve 38 open for dispensing.

For venting, the housing wall 20 is provided with large vent openings 60 proximate to the inlet opening 28 bordered by reinforcement ribs 62 which guide two reciprocating valve members 64 and 66 therein that have movable side walls 64A and 66A defining two chambers 64C and 66C. When subjected to adequate water supply pressure, the walls coact with each other to close the vent openings at 60. However, end walls 64E and 66E are movable with their respective side walls and comprise valve elements for automatic venting as coordinated for predetermined coaction when normally separated by spring 68 at a low water supply gauge pressure. The strength of this spring determines the critical pressure at which mixing may proceed.

Preferably, the spring 68 induces venting at and below 6 to 10 p.s.i.g. so that all backflow of mixture is prevented by continued forward flow of fresh water and device is fully flushed and vented before zero p.s.i.g. is reached. Above 10 p.s.i.g. the proportioner is operative for proportioning and dispensing a mixture as controlled by the manual flow control main valve 36. This venting pressure can be designed to be higher for critical mixtures, if desired, as related to providing a minimum venting pressure below which the mixing and proportioning will not perform satisfactorily.

SOLUTE SUPPLY

The solute supply 70 is designed for wide open flow when used and although the supply tube 72 could lead directly to the mixing zone inlet opening 74 it is performed to valve the solute, ON or OFF, selectively and simultaneously with the water, through a mechanical connection 76 with the manual actuator 36 when solute is used. The solute valve 56 is located on top of the outlet end 80 of the housing 20 as a unit 81 to the rear of the thumb handle 48 and the valve 56 being spool shaped the valve housing 83 has two cylindrical slide portions 82 and 84 of different diameters separated by a tapering shoulder 56 for ease of assembly with a spring 88 for normally closing the valve which is retained closed by pressure differentials across the valve effected by the area of the head 90 of the spool valve 56 exposed to atmosphere being greater than the area of the head 90 thereof exposed to the solute valve inlet port 92 when closed. Thereby, any drop in pressure in the intermediate space 94 when open through the passage 96 to the opening 74 will tend to hold the valve 56 closed.

During a mixing operation with the solute and solvent valves open the free flowing solute is under approximately zero gauge pressure within ± 2 p.s.i.g. and the load on the push rod 50 is quite modest. On the other hand, if solvent alone is being dispensed, there is no load involved with the push rod 50 and any unsatisfied aspirating effect against the internal balances between the spool valve heads with the atmospheric pressure against the head 81 urging closure of the valve head 90.

When the solute valve 90 is opened it is desired that the solute flow as freely as the solvent can ingest it. When closed the solute trapped beyond the valve 90, being liquid solid, will not respond to any aspirating effect.

Either plain solvent or a chemical solution can be discharged merely by selectively turning the solute valve shaft 56 by the end tab 85 a quarter turn for the tab into interference with latching the fork 87 on the T-head 52 of the push rod 50. When the push rod 50 is pressed far enough the dispensing of solvent or a mixture may be sustained by the latch 58 any length of time without manual attention.

The larger cylindrical portion of the housing 83 opens towards the front of the gun where it receives a T-shaped fitting 61 whose inner end valve head 65 is of the full housing diameter 63 and is rotatable as sealed in the mouth 67 of the valve chamber with an O-ring under mild negative gauge pressure during operation with the solute suspended from the gun. The inner end of the member 61 serves as the cut-off valve seat 92. The outer end of the arm 71 serves as a nipple that can be adjustably positioned over 180° on either side for the convenient attachment of the semi-transparent solute supply hose 72 where the prime of the solute can be visually checked at a glance.

The head end of the passage 73 in the leg portion provides a valve port 75 where it intersects the arm openings. A rotary valve 77 is mounted in the second arm 81 and has an externally exposed screwdriver kerf 85, which also serves as an indicator, and a hollow inner end 87 defining an L-passage 91 therethrough. A ring element 93 at the inner end journals the inner end so that the lateral opening coacts as a valve with the cylindrical concavity of the valve port 75. With this arrangement the T-fitting can be displaced 180° for left or right hand operation, and the rotary valve 77 is subjected to negative gauge pressure at the port for holding it in place.

PROPORTIONING AND MIXING

The housing 20 provides a porportioning mixing chamber 98 adjacent to its outlet end 80 which receives solvent from the main valve 38 and solute through the opening 74 in the side wall thereof. The chamber 98 is molded and tapers inwardly slightly. The mixer-proportioner unit 16 received in the mixing chamber 98 comprises an outer shell 100 (FIG. 9) whose outside surface 102 tapers inwardly slightly from an external flange 104 the same as the inner wall of the housing 89 for ready placement and replacement therein. The external flange 104 adjacent its outer end which supports a resilient seal 106 that engages the outer end 108 of the gun housing as held in place by a gland nut 110 threaded at 112 to the outer end 108 of the gun housing 20. Adjacent the inner end of the shell an external circumferential groove 114 is provided for coincidence with the opening 74 in the housing wall 20 and has an opening 116 from the groove to the interior of the shell 100 for flow of solute to the primary stage of the proportioner-mixer assembly 16. Closer to its inner end the shell 100 has an external shouldered space 118 receiving an O-ring 120 sealing against the escape of any liquid at this point.

The upstream end of the shell receives an anti-backflow check valve section 122 on a reduced end portion 124 (FIGS. 3A and 4A). This section comprises an axial draw molded body 126 having an enlarged entrance area 128 housing a backflow check valve 130 (FIG. 4A) closing against shoulder 132. The check valve in turn comprises a collar defining a valve seat 134 and a cage 136 telescoping therethrough carrying a resilient valve washer 138 supported by the rounded face of a retainer 140. Both are assembled on a central stud 142 to close against the valve seat. Shoulders 144 on the cage define with the housing 14 a circumferential groove that receives a light compression spring 146 which urges the closure of the valve. The prime of the jet pump is thereby maintained when not dispensing particularly as when both of the valves 56 and 38 are closed. This permits location of the solute supply 70 above the proportioner gun as well as below and is within the possible work range height of a person handling the portable solute supply means.

The inside wall 122 of the shell 100 also tapers inwardly to receive the proportioner-mixer assembly of elements press-fitted therein permanently in correct orientation. The invention is illustrated with three elements collectively providing three interrelated stages permuted from a wide selection of defined different mixing zone inlet and outlet port sizes and for different but determined output ratios. The upstream element 148 (FIG. 9) is cored from both ends. The upstream core thereof forms the coverging wall nozzles 150, 152 and 154 of all three stages and the downstream core forms the diverging wall energy converter 156 of the first stage. A saw cut kerf forms the confluence gap or mixing zone 158 therebetween in communication with the opening 74 to introduce the solute. The third stage nozzle 154 is axially located; the first stage nozzle 150 and diverging wall energy converter 156 are located laterally thereof on one side and the second stage nozzle 152 is divided into several nozzles (FIG. 10) located on the other side of and spaced around the third stage nozzle 154.

The intermediate element 160 centrally telescopes over the third stage nozzle 154. It provides the second stage mixing zone with diverging wall energy converters 160 disposed in alignment with the second stage nozzles 152 and provides an axial space between the elements which serves collectively as an outlet chamber 166 for the first stage confluence mixing zones 164 for the second stage nozzles.

The final stage element 170 provides the diverging wall energy converter and mixing zone 172 of the third stage nozzle. If is disposed in axial alignment with its nozzle 154 and is spaced therefrom to provide a space 168 that receives the output from the second stage mixer 162 and supplies it as a solute to the confluence zone 174 of the third stage mixer 172.

In manufacture, the triple mixer-proportioner lends itself for quick molding changes from one set of ratios to another merely by changing pin sizes in the cores, or, by not using pins to form the nozzle of any one of the mixer stages if only a two-stage pump is designed.

For example, with a two-stage free flowing solute system the relative diameters of the port flow areas may be as follows for an overall ratio of 1:24 and rate of flow at 6 gallons per minutes of water as a solvent:

|  | Zone Inlet Port | Zone Outlet Port |  |
|---|---|---|---|
| First stage | 0.0664" | 0.1713" | (1-3) |
| Second stage | 0.0885" | 0.2056" | (1-8) |

Also by way of example, but not limitation, the relative diameters of the port flow areas for a free flowing solute system are as follows for an overall ratio of 1:64 and rate of flow at 6 gallons per minute of solvent at 40 p.s.i.g.:

|  | Zone Inlet Port | Zone Outlet Port |
|---|---|---|
| First stage | (155) 0.0395 D | (157) 0.0527 D (1:4) |
| Each of 3 second stages | (163) 0.0582 D | (165) 0.0776 D (1:4) |
| Third stage | (173) 0.1996 D | (175) 0.2677 D (1:4) |

Rate of flow is related to solvent pressures. The relative sizes of the inlet and outlet ports of the stages determine the ratio, their overall sizes the rate of flow. Preferably, the first stage is less than 1 to 5 and if the ultimate ratio is above a 1 to 4 ratio (20% solution) the overall system ratio is divided up between the other stages in such a way that the first stage ratio resides in that area where there is minimum degradation, a minimum degradation for the overall system is attained. This essentially relates the elements of the invention and ultra high ratios may be provided.

For example, if a 1 to 16 system ratio is desired and a single stage 1 to 16 proportioner is used, degradation is based upon 1 to 16. If a two-stage system is used and is divided arbitrarily on a 1 to 4, 1 to 4 basis, which still provides 1 to 16 overall, the degradation of the first stage would then be based on the 1 to 4 ratio rather than the 1 to 16. This essentially cuts down the degradation of the overall system. The first stage isolates the following stages with respect to degradation.

The importance of this system is noted when compared with a single stage 1 to 16 system that might have a degradation of plus or minus 20% for a given lift height change. By using the two-stage system this is cut down to only plus or minus 5% for the same lift height change. The two stages have reduced that which may be intolerable at 20% to a 7% variation that is much more tolerable.

In implementing this concept, it may be noted that pressure upon incoming solvent is converted to kinetic energy as it flows into the mixing chamber and whatever pressure there is on the solute becomes the pressure in the mixing chamber. If the kinetic energy is never reconverted to pressure, the ultimate pressure upon the mixture even if it passes through several mixing chambers the unit will not act as a predictable proportioner.

If there is to be any pressure on the resulting mixture, the kinetic energy must be reconverted to pressure in whole or part. This is done by conducting the mixture from the mixing chamber outlet through a progressively enlarging passage and the pressure thus established becomes the solute pressure in the next mixing chamber. If the final output pressure is to be soft flow, as in a dispenser, the enlarging passage or passageways need only bring the succeeding mixing chambers to atmospheric pressure for final discharge. If the first output pressure is to provide a hard flow from a nozzle, diverging walls of the enlarging passages are designed in a well known manner to optimize the pressure upon the mixture for use as the solute in the next stage to establish higher pressures in succeeding mixing zones as in an applicator.

It should also be noted that the confluent liquids are directed through substantially short cylindrical openings defining the ports having flow areas larger than the respective solvent nozzles in the ratios that produce the ultimate proportioning desired. The ports need not be cylindrical but are more easily produced, have the least surface friction, and are more enduring to preserve size against erosion.

The jetting water molecules freely and fully transfer flow energy in proportion to their jet strength to entrain molecules of the solutes in the mixing zones and the diverging walls convert energy in relation to the differential in the relative sizes of the inlet and outlet ports thereof to mix the confluent liquids.

MIXER ACTION

Where the solute can or does flow freely to a mixer chamber regardless of the pressure thereon, there is very little degradation of the mixture ratio unless the solute pressure is below the environmental pressure (atmosphere) in a mixing chamber, or the pressure upon the mixture leaving the last stage drops enough to reflect back upon the mixing chamber as where the discharge nozzle is too large.

In the present invention, contrary to the practice in conventional single stage mixer-proportioner, the dispensing opening 176 may be equal in flow area to the last stage outlet port, and within substantial tolerances can be safely less to improve jet discharge up to but not beyond the point where the equalization of solvent and solute mixture pressure is disturbed in the zone 174 of the last stage. Accordingly, an extension conduit 180 (FIGS. 7 and 8) of reasonable length mountable on the gun can be used interchangeably between the mixer proportioner and mounted nozzles 12 without disturbing the ratio.

DISCHARGE NOZZLES AND EXTENDER JOINTS

The outlet end of the shell 100 of the mixer-proportioner unit 16 extends beyond the flange 104 and internally defines a diverging conical tapering surface 182 ending in an internal flange 184 of a few thousandths of an inch reduced diameter (FIG. 9) and may be considered to be a locking flange. The extension, tapering surface and flange 184 may be termed a female joint member 188.

Received within this joint member 188 may be any one of a selection of dispensing nozzles 12 or an extender conduit 14 which terminally has a corresponding but external taper 190 terminating at the upstream end in mating relation with the surface 182 and having an external groove or shoulder 192 of a few thousandths of an inch deep. The taper surface 190 and flange 192 may be termed a male joint member 194 and may be repeated intermediate the conduit sections at 194A with corresponding taper and flange elements identified with the suffix A. The extender conduit is provided with a female joint member 188 at its outlet end and the dispensing nozzles are provided with male joint members 194 at their inlet ends for interchangeable use on the extender conduit or the mixer-proportioner.

The joint members 188 and 194 have a wall thickness of approximately 1/16 inch thick and frictionally overlap about 1 inch with a taper of 0.25 inch in 12 inches. Their walls are glass smooth as molded from an acetal resin such as marketed under the trademark "Delrin" by E. I. duPont de Nemours & Co.

The overlap provided by these tapers cannot be easily tightened or released by relative axial or rotary movement, but with this wall thickness the tapers of two mating ends when telescoped can be easily flexed laterally back and forth from coaxial alignment in a common plane whereby the joint ovates transversely of the plane enough to tighten the contact on one side while the contacting surfaces on the other side loosen and slide their engagement in a longitudinal direction under the repeated reversals of flexing. The joint tightens or loosens depending on the direction of opposing axial forces that are additionally applied to the joint during flexing. This planar flexing at the joints enables all parts to be properly oriented in proper alignment without any critical adjustment conventionally required with threaded or bayonet type joints, there being no rotational adjustment required after final assembly even with a tubular elbow section being used as one of the conduit elements. Rotational orientation can be provided before the joints are tightened.

If the joints are to be permanent, they can be engaged far enough for the flange 192 and groove 184 of each joint to engage, otherwise, short of this complete engagement they can be made up and dismantled interchangeably at will.

DISCHARGE NOZZLES

The discharge nozzles 12 interchangeably associated with the flow areas of the mixer proportioners described are of two types, soft flow 12S and hard flow 12H. In the soft flow a cylindrical housing 196 (FIG. 8) is provided with a male joint member 194 having the converging throat dispensing opening 176 with a flow area related to that of the mixer third stage outlet port flow area 175 which directs a discharge stream axially through a zone 202 against a target 198 (FIG. 6) supported on cross-members 200 at the outlet 204 at the end of the housing. The size of the zone 202 in length is approximately 30 times the diameter of the nozzle 176, or five times the diameter of the inlet housing, or both, and the target 198 about twice the diameter of the nozzle 176. The stream from the nozzle upon start-up splashes radially from the target against the side wall 196 with a portion flowing back along the wall progressively displacing and replacing air in the space around the jet stream whereupon the zone 202 of the housing goes "liquid solid" in a fraction of a second and frictionally engages and directly slows down the jet stream, absorbing the kinetic flow energy and discharging the mixture as a soft flow through the nozzle outlet openings 204, which with the nozzle outlet 204 below the surface of the water discharged will not cause any foaming or splashing in a bucket or receiving container.

The hard flow nozzle 12H is a shorter one and preferably has an exchangeable tip 204 to provide the appropriate flow area and rate of flow for a jet stream, a fan, or a spray discharge flow having a flow area coacting with and somewhat smaller than the flow area of the proportioning mixer outlet port 175 for mixture ratio accuracy. Preferably, a single nozzle body 12H is provided which interchangeably receives secondary nozzle caps mounted coaxial thereon to provide particular cross-sectional flow shapes.

EXTENSION CONDUIT

For minimizing the conduit pressure losses and cost of various conventional cylindrical flow dispensing conduits to provide assured ratio accuracy, the extension conduit 14 of the invention is also a designed structure that can be provided either as a single unit or preferably made up of several sections for shipping purposes and serve either as a permanent unit or a knock-down assembly as related to the joint structure described.

Each section defines a conduit wall 210 that gradually expands in the direction of flow and the connections at opposite ends of each conduit comprise correspondingly tapered mating joint elements.

Accordingly, a preferred embodiment of the invention has been described as a complete functioning unitary system with several adaptations for proportioning and dispensing a substantially accurate mixture ratio over a wide range of positive pressures including a multi-stage mixer having a mathematical relationship relating the overall degradation in ratio, if any, to that of the first stage with minimum variation of solute pressure approximating zero gauge pressure and an ultimate loss of pressure less than 10%.

What is claimed is:

1. The multi-stage method of mixing and dispensing a solute with a pressurized solvent and dispensing the solution with solvent pressure comprising:

converting pressure of a flowing stream of solvent of predetermined cross-sectional flow area to kinetic energy, transferring kinetic energy to a free flowing solute at substantially atmospheric pressure to form a flowing stream of primary solution of a larger flow area and converting the flow energy of the primary solution to pressure;

converting solvent pressure of a another flowing stream of solvent of predetermined cross-sectional flow area to kinetic energy and transferring therefrom kinetic energy to said primary solution at approximately the pressure of said primary solution to form a second solution having a flow area larger than said flowing stream of primary solution and converting the flow energy thereof to pressure; and discharging the second solution to a lower pressure environment through an opening having a flow area at least as large as the last said larger flow areas.

2. The method of mixing and dispensing in claim 1 including converting solvent pressure of another flowing stream of solvent of pre-determined cross-sectional flow area to kinetic energy, transferring kinetic energy to said second situation at approximately the pressure of said second solution to form a further solution having a flow area larger than that of said second solution and converting the flow energy thereof to pressure.

3. The method of proportioning defined in claim 1 including repeating the second step for a third step with all three steps each providing a solution ratio of less than 1 to 5.

4. The method of mixing and dispensing defined in claim 1 in which the relation of said larger flow areas and respective flow areas of solvent produce the ultimate ratio proportioning of the mixture desired.

5. The process of concurrently flowing converging streams of distinctive liquids having different gauge pressures one of which is substantially zero gauge pressure and the other a higher pressure; converting the higher pressure at the point of confluence to kinetic flow energy; mixing them at substantially zero gauge pressure and converting kinetic flow energy back to a positive gauge pressure in a flowing stream, converting said higher pressure of another stream of the higher pressure liquid to kinetic flow energy at a point of confluence with said mixture as a flowing stream, and mixing them at a positive guage pressure to form a solution and reconverting said kinetic flow energy back to gauge pressure in a flowing stream having a size-determined flow area, and confining said solution to a flowing stream and discharging the stream through a dispensing opening having a flow area within 5% smaller than said determined flow area.

6. The process of mixing a solute at atmospheric pressure with variable pressure solvent comprising:

progressively contracting a flowing stream of the solvent to convert pressure thereon to jet flow energy;

ingesting a free flowing solute with said jet flow energy in a first stage of confluence of solvent and solute at approximately zero gauge pressure at the point of confluence to form a flowing stream of primary solution;

expanding the flowing stream of primary solution to convert jet flow energy thereof to a pressurized stream;

simultaneously therewith progressively contracting a second flowing stream of the solvent to convert pressure thereon to jet flow energy;

mixing the pressurized primary solution and the second flowing stream of the solvent at a positive gauge pressure at the point of their confluence to form a flowing stream of a second solution;

controlling the ratio of said solutions by the relative cross sectional flow areas of the solvent jets and cross-sectional flow areas of said mixtures from said confluences computed for a free flowing solute at approximately zero gauge pressure and a solvent flow at a pressure approximately three atmospheres of pressure; and discharging the ultimate mixture to atmosphere.

7. The process defined in claim 6 including expanding the flowing stream of the second solution to convert jet flow energy thereof to a pressurized stream.

8. The process defined in claim 6 including trapping the flow of any of the mixtures in a reverse direction when the pressure upon the solvent is below 10 p.s.i.g.

9. The process defined in claim 6 in which the relation of flow areas is represented by diameters of 0.1713 inch and 0.2056 inch in the second stage within a plus 14% designed variation, and 0.0664 inch and 0.0885 inch in the first stage for a 1 to 3 first stage ratio for a flow of 6 gallons of water as a solvent and a water-like liquid as a solute for a 1 to 24 solution output.

10. The process defined in claim 6 in which the relation of port flow areas is represented by diameters of 0.0395 inch, 0.0582 inch and 0.1996 inch for the inlet ports of three stages in three porportioning stages co-acting with three outlet ports of 0.0527 inch, 0.0776 inch and 0.2677 inch, respectively, provide a ratio of 1:64 with a rate of flow of 6 gallons per minute of solvent at 40 p.s.i.g.

11. The method of mixing a solution of a predetermined ratio of solvent and solute dispensed through a discharge opening comprising dividing the solvent flowing at a given pressure above 10 p.s.i.g. into two streams having a flow related to their proportion in the ultimate solution, converting the pressures of said stream of lesser volume to jet flow energy at zero gauge pressure and converging same with a free flowing stream of solute at approximately zero gauge pressure reconverting the flow energy of the mixture to pressure, converting the pressure of the stream of greater volume to flow energy at the pressure of said mixture, converging said mixture and said stream of greater volume under jet flow energy at a positive gauge pressure for molecular intermingling in said predetermined final ratio.

* * * * *